AUTOMATIC POWER OUTPUT AND DIFFERENCE FREQUENCY CONTROL SYSTEMS

Filed Dec. 28, 1955 2 Sheets-Sheet 1

INVENTOR.
WILLIAM T. CHAPIN
BY
C. L. O'Brien
H. W. Losche Att'ys

Nov. 17, 1959 W. T. CHAPIN 2,913,718

AUTOMATIC POWER OUTPUT AND DIFFERENCE FREQUENCY CONTROL SYSTEMS

Filed Dec. 28, 1955 2 Sheets-Sheet 2

INVENTOR.
WILLIAM T. CHAPIN

BY

A. D. O'Brien
H. W. Loeslie Att'ys

United States Patent Office 2,913,718

Patented Nov. 17, 1959

2,913,718

AUTOMATIC POWER OUTPUT AND DIFFERENCE FREQUENCY CONTROL SYSTEMS

William T. Chapin, Baldwinsville, N.Y., assignor, by mesne assignments, to the United States of America as represented by the Secretary of the Navy Application December 28, 1955, Serial No. 556,022

13 Claims. (Cl. 343—17.1)

In accordance with this invention, a method and means are provided for automatically maintaining at maximum the power output of velocity-modulated, cavity-tuned, microwave oscillators such as, for example, reflex klystrons. The invention also encompasses a method and means for automatic frequency control (AFC) which automatically effects changes in the frequency of one or more continuously operating oscillators in response both to rapid, small-magnitude, and comparatively slow, large-magnitude changes in the frequency of a periodically operating microwave oscillator such that a substantially fixed range of frequency difference between the two may be maintained.

Fundamentally, the invention involves the application of time-spaced test pulses to the reflector plate of a reflex-type, velocity-modulated microwave oscillator. Such a pulse momentarily changes the reflector plate voltage and produces a corresponding transient change in the power output of the oscillator. The generation of these transients is related to the fact that the modes of oscillation for reflex klystrons are shaped as symmetrical convex parabolas whereon each point represents the power output for a given value of reflector plate voltage, and whereon maximum power output occurs at the apex, that is, where the curve intersects the axis of symmetry. Inasmuch as the curve slopes downward from the point of maximum power, a transient change in reflector plate potential, such as that which occurs when a test pulse is applied, produces a corresponding transient change in the power output of the oscillator. The amplitude and polarity of the transient will be determined by the location of the oscillator operating point on the mode curve when the pulse is applied. For example, if the reflector plate potential is such that the oscillator is operating on the downward slope of the curve to the right of the apex, the application of a test pulse to the reflector plate will produce a corresponding power output transient of a first polarity; if the operating point had been to the left of the apex, a power output transient of a second and opposite polarity would have resulted.

The transient change in oscillator power output is then detected and integrated to produce a pulse which, for convenience, may be labelled the error pulse because it represents the direction of displacement of the operating point of the oscillator from the apex, that is, the point of maximum power output. The error pulse is then amplified, detected as to polarity, and applied to actuate means for retuning the oscillator such that its mode is shifted in frequency in an amount and direction sufficient to provide maximum power output. When this condition exists, the operating point of the oscillator is so near the point of maximum power output that the error pulses no longer actuate the tuning means. As a result, the automatic tuning circuit is inoperative until the operating point drifts again to a point on the mode characteristic where error pulses of sufficient magnitude will be generated and corrective action, as described, again produced.

In general a basic embodiment of the invention comprises a reflex klystron having a resonant-cavity tuning spline, a source of test pulses coupled to the reflector plate of the klystron, a detector and integrating circuit coupled in parallel with the oscillator load to integrate a portion of the output and produce error pulses in response to the test pulses, a pulse amplifier coupled to amplify the error pulse output of the integrating circuit, a pulse polarity discriminator coupled to the output of the pulse amplifier to develop a direct-current bias dependent upon the polarity and amplitude of the error pulse input, a balanced amplifier responsive to changes in the aforesaid bias, a differential relay actuated by the output of the balanced amplifier, and a reversible motor controlled in operation and direction of rotation by the relay and coupled to the tuning spline of the klystron cavity such that the oscillator will be tuned to minimize or eliminate the error pulses, a condition which exists, as stated above, when maximum power is being generated by the oscillator.

In its basic embodiment, therefore, the invention comprises a method and means for maintaining the power output of reflex-type, velocity-modulated microwave oscillators at maximum notwithstanding drift in one or more of the operating parameters of the oscillator.

The preferred embodiment of the invention provides a method and means of AFC to maintain a difference, fixed within predetermined limits, between the frequency of the continuously operating local oscillator of a radar receiver and the periodically operating pulse oscillator of a radar transmitter. Such a preferred embodiment is especially useful in radar systems used in circumstances where it may be necessary to tune the radar pulse generator to a new operating frequency and have the local oscillator frequency follow or "track" the change automatically such that the frequency difference between the two oscillators is maintained continuously within the aforesaid predetermined limits of variation; that is, at the intermediate frequency of the receiver.

In the environment of a radar system, the preferred embodiment of the invention comprises a continuously-operating, reflex-klystron local oscillator for the radar receiver; a periodically-operating, tunable magnetron oscillator for the radar transmitter triggered into operation for fixed time intervals in response to time-spaced synchronizing pulses; and a rapid-response automatic frequency control system of the conventional sweep-search type, hereinafter called the reflector plate AFC, coupled to maintain a relatively constant intermediate frequency for the radar receiver. When the magnetron of the transmitter is tuned to a new operating frequency, the beat frequency, produced when the local oscillator and radar pulse frequencies are mixed, tends to change from the intermediate frequency required for satisfactory receiver operation. Within a range of effectiveness limited to a mid-portion of the mode of oscillation, the conventional reflector plate AFC system changes the reflector plate voltage of the klystron in a direction which tends to follow the change in the magnetron frequency and, as a result, to maintain the correct intermediate frequency. However, this AFC circuit will be unable to follow beyond the comparatively narrow range of effectiveness and, because the tuning of the magnetron normally will require compensation far beyond such limits, it is necessary to cause the mode of oscillation itself to shift or follow-up the corrective action of the reflector plate AFC system such that the range of effective compensation within the mode is moved in the direction of the local-oscillator frequency change required to maintain the intermediate frequency. Unless the mode itself should be made to shift, the change in magnetron frequency eventually would result in such a large deviation from the intermediate frequency that the receiver would be rendered inoperative and the radar system itself thereby neutralized.

In the preferred embodiment, the required follow-up shifting of the mode of oscillation of the klystron is accomplished as follows: Between operating intervals of the transmitter magnetron, a test pulse derived from the synchronizing pulse generator of the radar system is applied to the reflector plate of the klystron oscillator. As set forth above, this pulse effects, for at least a substantial portion of its duration, a corresponding error pulse in the power output of the oscillator having a polarity and magnitude determined by the direction and magnitude of the pre-existing shift of the klystron frequency along the mode curve, a shift which was produced, of course, by the reflector plate AFC as it followed the changing magnetron frequency. The error pulse is then transmitted to an amplifier and, after amplification therein is passed to a polarity discriminator. The discriminator output is applied to actuate a differential relay which, in turn, energizes a bi-directional motor coupled to the cavity-tuning spline of the klystron. The motor is caused to rotate in a direction which will tune the resonant cavity and thereby shift the mode to follow-up the aforesaid frequency and power deviation produced by the reflector plate AFC. When the transmitter magnetron has been retuned and the comparatively slow, large-magnitude changes in its frequency have ceased, the automatic follow-up action of the cavity tuning circuit also ceases. This leaves the conventional reflector plate AFC system in control and, as is well known, this system is responsive almost instantaneously to change the klystron frequency within mode limits and thereby compensate for rapid, small-magnitude fluctuations in magnetron frequency such as those which occur normally during radar operation and are attributable, primarily, to so-called "pulling" or variable loading during the scanning operation of the radar antenna.

It should be understood, therefore, that the preferred embodiment of the invention makes it possible to cause the mode of oscillation of the klystron local oscillator of a radar receiver to shift or "track" automatically the comparatively slow, large-magnitude changes in the operating frequency of the transmitter magnetron which may occur, for example, when the magnetron is tuned to a new operating frequency. Such "tracking" by the local oscillator is required in order to keep the conventional reflector plate AFC system and, hence, the radar system itself operative during the aforesaid changes in the transmitter frequency.

GENERAL

Heretofore, inability to change the radio frequency of transmitted radar pulses during system operation has made radars especially vulnerable to enemy frequency jamming techniques. Where such enemy countermeasures are encountered, radar systems frequently are rendered substantially ineffective. Accordingly, a method and means making it possible to vary the radio frequency of transmitted pulses has become of utmost importance to the successful use of radar systems under such conditions.

To change the pulse frequency radar transmitter during operation it is necessary to cause the local oscillator of the radar receiver to "track" the changing frequency of the transmitter so that the mixture of radar-pulse and local-oscillator frequencies will generate the intermediate frequency to which the receiver circuits are tuned. The source of the difficulty in resolving this problem is in the tuning characteristics of the reflex klystron ordinarily used in the local oscillator of the radar receiver. This difficulty is accentuated to some extent by the well-known frequency instability of the transmitter magnetron.

Accordingly, the principal objects of this invention are:

(1) To provide means in a radar system to make possible changes of the transmitter operating frequency without disabling the system for prolonged periods of time for retuning the radar receiver oscillator to the frequency required to produce the intermediate frequency.

(2) To provide means for retuning a reflex-type, velocity-modulated oscillator for maximum power output in response to diminutions of such output below a predetermined minimum level.

(3) To provide means for causing the mode of oscillation of a reflex-type, velocity-modulated oscillator to follow or "track" the changing output frequency of a reference frequency oscillator.

(4) To provide an automatic frequency control system which compensates effectively not only for rapid, small-amplitude frequency variations but also for comparatively slow, large-amplitude variations.

(5) To provide an automatic frequency control system for maintaining a preset standard frequency difference between two oscillators having first means to compensate almost instantaneously for rapid, small-amplitude fluctuations from the standard frequency difference and having a second means to compensate effectively for comparatively slow, large-amplitude fluctuations from the standard frequency difference.

(6) To provide an automatic frequency control system for maintaining a prefixed standard frequency difference between a controlled reflex-type, velocity-modulated oscillator and a reference frequency oscillator wherein a first means is provided to cause the frequency output of the controlled oscillator to follow or "track" almost instantaneously in the frequency of the reference oscillator, and a second means is provided for causing the mode of oscillation of the controlled oscillator to shift through the frequency spectrum in order to follow or "track" comparatively slow, large-amplitude changes in the reference oscillator frequency and thereby maintain the aforesaid prefixed frequency difference.

(7) To provide means for automatically shifting the mode of oscillation of a radar receiver local oscillator of the reflex, velocity-modulated type in response to diminutions in the power output thereof produced when the conventional AFC system attempts to compensate for deviations from the receiver intermediate frequency which occur while the magnetron of the radar transmitter is being retuned to a new operating frequency.

(8) To provide means for effectuating the result of object (7) which makes possible maximum utilization of the existing circuitry of conventional radar systems.

(9) To provide means of superior economy and engineering simplicity for effectuating any of the aforestated objects.

The foregoing summary of the invention, discussion of the problem evoking its origination, and statement of its objects are intended merely to facilitate the development of an understanding and appreciation of its principal features, not to restrict its scope. It is probable that additional features of the invention will become apparent after reference to the following detailed description made in conjunction with the accompanying drawings wherein:

Figure 1(*b*) represents the interrelationships of signals and frequencies for the same mode of oscillation shifted to a new frequency range.

Figures 1, 2, 4:
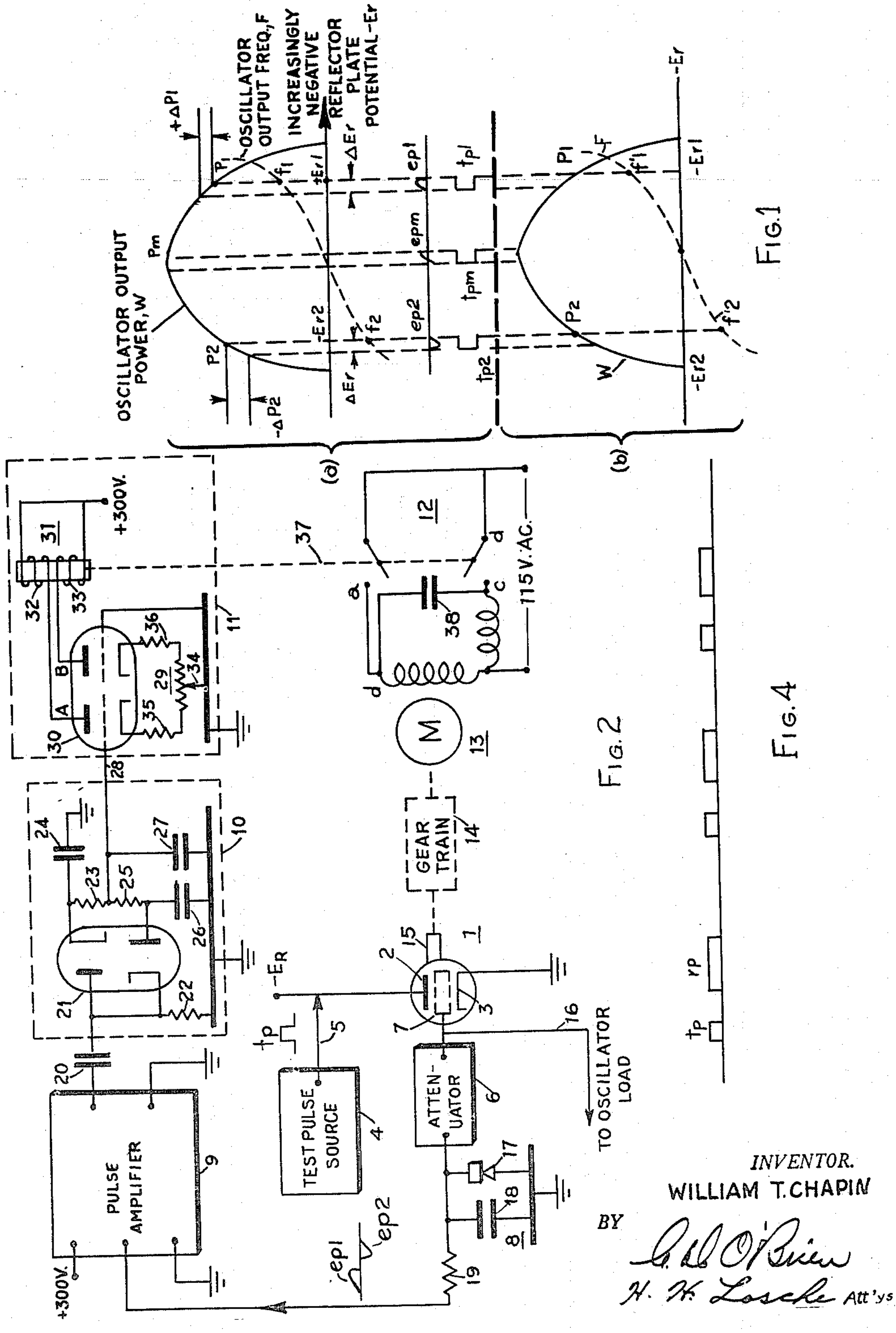
Figure 1(*a*) represents the interrelationship of the principal signals and frequencies for a given mode of oscillation of a reflex-type, velocity-modulated oscillator.
Figure 2 is a schematic-block diagram representing the apparatus of a basic embodiment whereby the power output of a reflex klystron local oscillator is maintained at maximum notwithstanding changes in its operating point along the curve of the mode of oscillation.
Figure 4 represents the time relationship between test pulses and radar pulses present in the embodiment of Figure 3.

In Figures 1(*a*) and (*b*) the principal functional features of the basic embodiment of the invention are represented graphically. The convex parabola represents the variation of oscillator output power, W, as the reflector plate potential, —E*r*, of a reflex klystron is made increasingly negative. Such a curve also is called the oscillator mode of oscillation. The dotted line, F, represents the variation of oscillator frequency through the mode. The curves reveal that power output decreases and frequency change increases rapidly as the reflector plate voltage, —E*r*, is changed in either direction from the point of maximum power P*m*. Accordingly, if a positive test pulse, *tp*, should be combined with the negative plate potential, —E*r*, it is apparent at once that a transient change, ΔP, will be produced in the power output from the oscillator. The polarity of such a transient change will be determined by the direction of any deviation of —E*r* from the point of maximum power, P*m*. For example, assume —E*r* has fluctuated in the increasingly negative direction to some value, —E*r*1. The oscillator then will be operating at a point of diminished power output, P1. If, under this condition of operation, a positive test pulse, *tp*1, is combined with —E*r*1, the negative reflector plate voltage will be decreased by the amount ΔE*r* and, as clearly indicated in part (*a*) of Figure 1, the output power undergoes a corresponding increase, becoming equal to *P*1+Δ*P*1. Thus, for a given mode of oscillation, the magnitude of power increase, ΔP1, will increase as (1) the displacement of the operating point, P1, to the right of P*m* becomes greater, and (2) the amplitude of the test pulse *tp*1 is increased.

On the other hand, when —E*r* has fluctuated in the less negative direction to some value, —E*r*2, where the oscillator is operating at output point, P2, the application of positive test pulse *tp*2 produces negative transients in the power output corresponding to —ΔP2. Under this condition, the power output is equal to *P*2—Δ*P*2. The magnitude of —ΔP2 will increase as (1) the displacement of the operating point, P2, to the left of P*m* becomes greater, and (2) the amplitude of *tp*2 is increased. The transient changes of output power of the oscillator may be detected and integrated to produce corresponding error pulses, +*ep*1 and —*ep*2, having polarities and amplitudes indicative of the direction and magnitudes of the change in reflector plate potential, —E*r*, required to produce maximum power output, P*m*.

It should be noticed that the application of *tpm* at the point near maximum power output, P*m*, does not result in a usable error pulse output; the resulting pulse, *epm*, has self-neutralizing positive and negative components. Furthermore, it should be apparent from the curve of Figure 1, that the operating point must be displaced from P*m* to a point where the slope is sufficient to produce a transient change of power large enough for conversion into an error pulse having a usable amplitude.

The oscillator output frequency curve, F, Figure 1, indicates that changes in —E*r* also produce corresponding changes in frequency. Hence, in Figure 1, part (*a*), when —E*r* is at —E*r*1, the output frequency has increased to *f*1; when —E*r* is at —E*r*2, the output frequency has decreased to *f*2. As the changes of —E*r* approach the mode limits, oscillator output power diminishes to zero and the change in frequency becomes greatest.

In Figure 1, part (*b*), the same mode of oscillation is represented as having been shifted to embrace a new frequency range. All of the parameters of operation are the same as those shown in Figure 1, part (*a*), except the range of output frequencies embraced within the mode. The same changes of reflector plate voltage, E*r*1 and E*r*2, used to produce *f*1 and *f*2 of Figure 1, part (*a*), produce *f*′1 and *f*′2 after the mode has been shifted. For example, the mode of operation of reflex-type, velocity-modulated oscillators may be shifted by varying the dimensions or configuration of the cavity resonator.

Although only one mode of oscillation is represented in Figure 1, it should be understood that a multiplicity of modes of varying maximum amplitudes may be generated by varying the negative potential on the reflector plate over its entire range. However, the choice of a particular mode of oscillation is unimportant in the practice of this invention, except where the selection of components by the system designer may be determined thereby in order to construct a system in accordance with the invention having predetermined operating specifications. For example, in order to obtain transient changes of power of greater amplitude for a test pulse of a given amplitude it may be desirable to select a mode of operation having a relatively high amplitude and, hence, a greater slope $$\frac{\Delta P}{\Delta Er}$$

as the operating point is moved away from the point of maximum power, P*m*. Thus, a mode of oscillation of relatively low maximum power output may be so flat that test pulses of very large amplitude may be necessary to produce a usable transient change of output power or, alternatively, it may be necessary to use excessively large amounts of amplification to amplify the very small error pulses which otherwise would result. It should be observed, therefore, that such considerations will be within the engineering design skill to be expected of those persons proficient in the art and further elaboration thereon is unnecessary.

*Physical description of the embodiment of Figure 2*

In Figure 2, a basic embodiment of the invention is represented comprising a reflex klystron oscillator 1 having its plate 2 connected to a source of negative plate potential, —E*r*, and its cathode 3 connected to a source of constant potential; a test pulse source 4 having its output 5 connected to provide test pulses, *tp*, to the plate 2 of the klystron such that power fluctuations having a polarity dependent upon the oscillator operating point on the mode curve will be produced in the klystron output; a detector-integrator circuit 8 connected to the resonant cavity output 7 of the klystron and effective to produce error pulses, *ep*1 and *ep*2 from oscillator power fluctuations fed thereto; an error pulse amplifier 9 connected to the output of the detector-integrator circuit; a pulse polarity discriminator circuit 10 connected to receive the amplified error pulses and to produce a unidirectional bias voltage having a magnitude dependent on the polarity of the incoming error pulses; a differential relay circuit 11 having a direction of operation dependent upon the magnitude of the unidirectional voltage from the discriminator; a reversing switch 12 mechanically linked to the differential relay for actuation thereby; a reversible motor 13 having a direction of rotation dependent on the position of the reversing switch; and a reducing gear train 14 mechanically linking the reversing motor and the cavity tuning spline 15 of the klystron. It should be apparent, therefore, that the named circuit components connected as shown in Figure 2 constitute a closed servo loop wherein the resonant cavity of the reflex klystron is tuned in response to changes in the oscillator power output. A separate conductor 16 is provided to connect the oscillator output to the load.

The test pulse source 4 may be comprised of any conventional pulse generator having an output of sufficient amplitude, duration, and periodicity to effectuate usable transients in the output power of oscillator 1. For example, the source of test pulses may be a conventional multivibrator such as one of those described and illustrated in volume 19, chapter 5, section 6 of the Radiation Laboratory Series entitled Waveforms.

The oscillator 1 may be comprised of any reflex-type, velocity-modulated tube having a means provided for mechanical tuning.

Although the detector-integrator circuit 8, the pulse polarity discriminator 10, and the differential relay circuit 11 are entirely conventional they are represented schematically to enhance the development of a more complete understanding of the principal characteristics of the basic embodiment.

Thus, the detector-integrator 8 may be comprised of a crystal diode 17 to rectify the portion of the oscillator output used for actuation of the closed servo loop. The capacitor 18, connected between the rectifier output and a source of constant potential, and the resistor 19 make up a conventional integrating circuit for passing the high-frequency components of the rectified output of the oscillator to the ground source of constant potential. Therefore, the integrating circuit may provide an output of comparatively smooth, low-frequency error pulses, such as *ep*1 and *ep*2, in response to the relatively slow transient fluctuations in oscillator power output which may be produced as a result of the test pulses applied to the plate 2.

The error pulse amplifier 9, shown in Figure 2 to be connected between a 300-volt source of plate potential and a ground source of constant potential, may be comprised of a chain of one or more conventional amplifying circuits. This amplifier may be terminated with a stage having a low-output impedance such as a cathode follower to match the low impedance input of the pulse polarity discriminator.

From the error pulse amplifier 9, the pulses pass through coupling capacitor 20 to dual diode 21 where they appear on the plate of one and the cathode of the other diode element. The input bias voltage for the diodes is developed across resistor 22. The unidirectional output voltage of the dual diode is developed across either one of two integrating circuits, comprised of resistor 23—capacitor 24, and resistor 25—capacitor 26, respectively. Capacitor 27, connected between the discriminator output conductor 28 and the ground source of constant potential, provides additional smoothing for the unidirectional output voltage of the discriminator.

The unidirectional potential developed on the output lead 28 of the polarity discriminator circuit 10 passes to the conventional differential relay circuit 11. This circuit includes balanced amplifier 29, shown to include the dual triode 30 having triode elements A and B, and bi-directional relay 31 having opposed coils 32 and 33. Each plate of the dual triode 30 is connected to a 300-volt source of positive D.-C. potential through one of the coils, 32 and 33, of the relay 31. The cathodes of dual triode 30 are connected to a ground source of constant potential through bias resistors, 35 and 36, and the balance-adjusting potentiometer 34. The grid of triode element B is connected directly to the ground source of constant potential. During the absence of error pulses, *ep*1 and *ep*2, the bias voltages on both halves, A and B, of dual triode 30 are such that plate current flowing through the opposing coils, 32 and 33, of bi-directional relay 31 are equal, that is, "balanced." The potentiometer 34 makes it possible to calibrate the amplifier for such "balanced" operation. During the presence of error pulses, *ep*1 or *ep*2, having a sufficient amplitude, the unidirectional voltage applied directly to the grid of triode element A from the polarity pulse discriminator will change in a direction dependent upon the pulse polarity. Thus, if it is assumed that the error pulse polarity is such that the bias on the grid of A becomes more negative, the plate current through coil 32 of relay 31 is decreased. As a result, the relay is operated through the mechanical coupling 37, for example, to close one of the normally-open contacts, *a* or *c*, of the reversing switch 12. When the grid bias is increased, plate current through triode half A is increased and, under such conditions, the opposite contact of the reversing switch 12 will be closed. When the plate currents of triode halves A and B are balanced, the bi-directional relay 31 is dynamically balanced and both contacts of reversing switch 12 remain open.

The reversing switch 12 is entirely conventional. In this embodiment it is sufficient if two mechanically disconnectable paths from a source of 115-volt, A.-C. potential are provided to separate field input terminals, *c* and *d*, of the single-phase reversible motor 13 provided, of course, that both of the aforesaid paths may be disconnected at the same time.

The reversible motor 13 also is conventional, operating from a single phase, 115-volt source. The phase shift required to produce rotation is provided by capacitor 38. As is well-known, the direction of rotation will depend upon whether the 115-volt, A.-C. power source is connected to terminal *c* or *a* of the field windings.

The reversible motor 13 is connected mechanically through reducing gear train 14 to the cavity tuning spline 15 of the klystron oscillator 1. The reducing gear train 14 may be comprised of any combination of gearing or other means for producing the required ratio of reduction in mechanical displacement between the rotor of motor 13 and the cavity tuning spline 15.

Although the components of the control system utilized in the embodiment of the invention illustrated in Figure 2 have been described in considerable detail, it should be understood that such details are not intended to delimit the general scope of the invention. Accordingly, any form of control circuitry, such as that comprised of items 9, 10, 11, 12, and 13 of Figure 2, responsive to error signals and operative to generate a corresponding mechanical displacement usable for tuning the resonant cavity of a reflex-type, velocity-modulated oscillator may be used in practicing the invention and, accordingly, must be regarded as within its scope.

*Operation of the Figure 2 embodiment*

In describing the operation of the basic embodiment of the invention, reference will be made to Figure 1 and Figure 2.

The test pulse source 4 generates periodically the positive test pulse, *tp*, represented in Figure 1 and Figure 2 which is then applied to the reflector plate 2 of oscillator 1, thereby causing the negative reflector plate potential, —E*r*, to become correspondingly less negative. The effect of positive pulses, *tp*, on the power output of oscillator 1 is represented clearly in Figure 1 as dependent upon the position of the operating point P1, P2, P*m* . . ., on the mode of oscillation curve, W, at the time that the test pulse is applied. Thus, if the instantaneous value of —E*r* should be that indicated at —E*r*1 of Figure 1(*a*) such that the power output of the oscillator would be represented by point P1 on the mode curve, the application of the test pulse, *tp*, will cause a corresponding transient rise in oscillator output power $+\Delta P1$, the amplitude of which will be determined by the amplitude of test pulse, *tp*, and the position of the operating point, P1, on the negative slope of the mode curve. On the other hand, if the test pulse, *tp*, should be applied when the instantaneous value of —E*r* is that represented by —E*r*2 of Figure 1(*a*), the operating point would be P2, located on the portion of the curve having positive slope and, obviously, the transient change of —E*r* in the less negative direction will diminish the power output of the oscillator correspondingly by amount $-\Delta P2$.

A portion of the output from the oscillator 1 passes from the output lead 16 through the attenuator 6 into the detector-integrator 8 where it is rectified across crystal diode 17 and integrated by the capacitor 18 and resistor 19 to produce the error pulse *ep*1 or *ep*2, depending upon the polarity of the transient change of power output from the oscillator caused by the application of test pulses *tp*. The error pulse, *ep*1 or *ep*2, usually is in the millivolt range. To increase its voltage to an amplitude usable for actuating the servo control apparatus, it is amplified in the error pulse amplifier 9. The amplified error pulse is then conducted to the pulse polarity discriminator 10 where it is sensed as to polarity and transformed into a corresponding change in unidirectional potential on the output lead 28. For example, assume that the incoming error pulse is positive in polarity. Current is drawn through the upper half of the duel diode 21 thereby causing the unidirectional potential on output lead 28 to become more positive. If the incoming error pulse had been negative, the lower half of the diode 21 would have become conductive in the opposite direction and the unidirectional potential on the output lead 28 would have become more negative.

The unidirectional output potential on lead 28 constitutes the grid bias voltage on direct-coupled balanced amplifier 29. During the absence of error pulses, both halves, A and B, of the balanced amplifier are conducting such that the currents in their plate circuits produce a canceling effect in the tendency of the opposing coils, 32 and 33 of the differential relay 31, to actuate the reversing switch 12. However, when a positive error pulse such as *ep*1 causes the bias on the grid of triode A to become more positive, the plate current of triode element A increases and the electromagnetic flux produced by the coil 32 exceeds that of coil 33, thereby causing the switch contact "*a*" of reversing switch 12, for example, to close and energize the field winding of the bidirectional motor 13. The motor then rotates until the resonant cavity 7 of the klystron oscillator 1 is retuned, thereby shifting the mode curve to the right such that the point of maximum power output, P*m*, is made to approach coincidence with the former operating point, P1, and the positive error pulses, *ep*1, are eliminated.

On the other hand, if it is assumed that the error pulses received by the discriminator are negative, such as *ep*2, Figure 1(*a*), the bias on the grid of triode element A will become more negative, the plate current will be decreased and the differential relay 31 will be unbalanced in a direction which will close switch contact *c*; the motor 13 will be caused to operate in the direction opposite to that caused by positive error pulses and, as a result, the tuning of the klystron oscillator 1 is such that the mode curve will be shifted to the left until the point of maximum power output, P*m*, approaches coincidence with the former operating point which, for example, might have been point P2 as shown in Figure 1(*a*). When the mode curve has been shifted to produce the aforesaid approximate coincidence of operating and maximum power output points, the error pulses are eliminated and, as before, both contacts of the reversing switch 12 are open and the motor 13 is dynamically damped. The control system is operative, therefore, to maintain the tuning of the reflex klystron oscillator such that maximum power output for a given mode of oscillation is always obtained therefrom notwithstanding variations in the reflector plate potential or any other parameters which may tend to move the operating point along the mode curve.

It should be apparent that the sensitivity of the control system will depend upon a number of factors. For example, increasing the amplitude of the test pulse, *tp*, at the output of the test pulse source 4 will produce a corresponding increase in the amplitude of the increment or decrement of power output from the oscillator 1. An increase in the amplification of the error pulse amplifier will make the system responsive to small error pulses. The time constant of the integrating circuits 23—24 and 25—26 in the output of the pulse polarity discriminator 10 may be increased or decreased to produce corresponding changes in the number of error pulses and, as a result, the time required to produce a sufficient change in the unidirectional output potential therefrom to actuate the differential relay.

In addition, the bias voltages applied to the balanced amplifier 29 may be preset to make the triode sections thereof operate in the non-linear regions of their respective characteristics. This will make the control circuit more sensitive to fluctuations of power output from maximum in one direction than in the other.

It should also be understood that auxiliary damping means actuated by the differential relay 31 also may be used in conjunction with the bi-directional motor 13. Furthermore, negative test pulses may be used in lieu of those of positive polarity.

Figure 3:
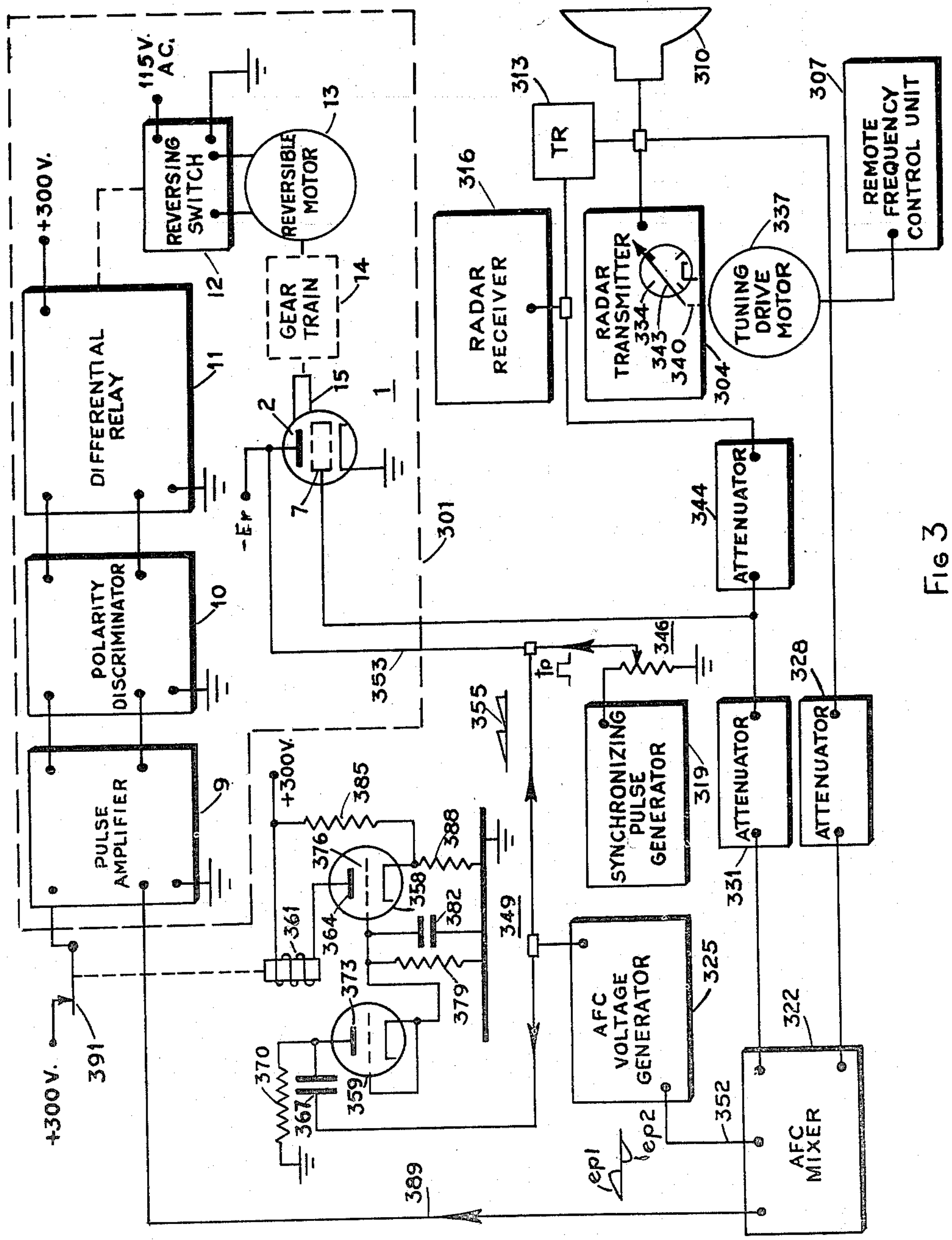
Figure 3 represents the preferred embodiment of the invention whereby the frequency of the reflex klystron local oscillator of the radar receiver is caused automatically to "track" changes in the radar transmitter frequency.

*Physical description of the embodiment of Figure 3*

The preferred embodiment of the invention, represented in Figure 3, is an AFC system which, for example, may be utilized in the environment of a conventional radar system to maintain a substantially fixed range of difference frequencies between an oscillator periodically pulsed into operation and a continuously operating, reflex-type, velocity-modulated oscillator notwithstanding changes in the tuning of the pulsed oscillator. The preferred embodiment incorporates the essential circuitry and principles of operation set forth in conjunction with the description of the basic embodiment, Figure 2. The components of the preferred embodiment common both to Figure 2 and Figure 3 have been given the same reference numerals.

In general, the preferred embodiment includes a portion of the basic embodiment of Figure 2 enclosed within the dotted lines 301, coupled into a conventional radar system to operate in conjunction with the conventional fast-acting reflector-plate AFC apparatus usually contained therein. The structure and operation of the components represented within the dotted lines 301 has been described thoroughly in connection with the basic embodiment, Figure 2. In the preferred embodiment, Figure 3, the circuitry of 301 functions as a servo follow-up channel for reasons which will become apparent after reference to the following detailed description of the operation of this embodiment.

In Figure 3, the radar system is entirely conventional and, accordingly, is represented by the blocks labeled with the names of its principal components. Hence, the radar system may comprise radar transmitter 304 having a remote frequency control unit 307 coupled thereto for adjusting the transmitter oscillator frequency during system operation, directional antenna 310 coupled to the transmitter and to T—R switch 313, a radar receiver 316 coupled to the transmitter through the T—R switch, and a synchronizing pulse generator 319 for producing the pulses required for actuating the transmitter and other system components at the proper times.

The conventional reflector-plate AFC apparatus is comprised of the AFC mixer 322 and the AFC voltage generator 325. A portion of the output energy from the transmitter oscillator and a portion of the output of the local oscillator 1 of the radar receiver are conducted to the AFC mixer 322 through attenuators 328 and 331, respectively. The receiver and the transmitter oscillator frequencies are heterodyned in the AFC mixer 322 and the resulting difference frequency is then passed to the AFC voltage generator 325 where any frequency deviations from a pre-established intermediate frequency are detected and a voltage is generated which, when applied to the reflector plate 2 of the local oscillator 1, will tend to change its output frequency in the direction and by the amount required to restore the difference frequency to the pre-established intermediate frequency.

In the preferred embodiment, the crystal current filter circuit of the AFC mixer 322 is utilized to fulfill the same function as the detector-integrator 8, Figure 2. Hence the transient changes in the power output of the local oscillator 1, which occur when the test pulses, *tp*, are applied to its plate 2 during the intervals between radar pulses, are detected and integrated in the AFC mixer 322 to form error pulses, *ep*. Inasmuch as the crystal current filter circuit of the AFC mixer 322 is functionally the same as that of detector-integrator 8, it is not represented schematically in Figure 3.

The radar receiver 316 and the reflector-plate AFC apparatus may be the same as those described in chapter 15, volume 23, of the Radiation Laboratory Series, entitled Microwave Receivers. On the other hand, it is unnecessary that the reflector plate AFC system be of the search-lock gas-tube type as described in the aforesaid reference. Any automatic frequency control system responsive substantially instantaneously to rapid, small-amplitude frequency fluctuations will suffice provided that the frequency compensation produced thereby results in a corresponding change in the operating point of the reflex klystron oscillator on its mode curve.

The radar transmitter 304 is entirely conventional. Any radar transmitter having a tunable magnetron 334 operative periodically in response to synchronizing pulses will be sufficient in a system constructed in accordance with this invention. Furthermore, the transmitter may have associated with it apparatus for varying the microwave frequency of the radar pulse output of transmitter 304 during system operation. This may be accomplished, for example, by providing a tuning drive motor 337 coupled through the mechanical linkage 340 to the tuning element 343 of magnetron 334. The drive motor 337 may be started and stopped and controlled in direction through the remote frequency control unit 307. Any reversible motor having adequate torque and damping characteristics may be used as the tuning drive motor 337. A reducing gear train (not shown) normally would be included in the mechanical coupling 340 between the motor 337 and the tuning element 343 of magnetron 334.

The remote frequency control 307 may be comprised of conventional switching equipment to energize, de-energize, and effect any changes of phase or power-supply connections to the motor required to reverse its direction of rotation or provide damping. Inasmuch as the details of control and damping circuitry for reversible motors are well known in the art and do not form any part of the subject invention, a more detailed description thereof is omitted.

The attentuator 344, connected between the radar receiver 316 and the local oscillator 1 reduces the amplitude of the oscillator output to a level appropriate for heterodyning with the radar return signal. The construction and function of attenuators 328, 331, and 344 are well-known and further description thereof appears to be unnecessary.

The synchronizing pulse generator 319 may be the conventional generator ordinarily used to time the operation of the various inter-related components of the radar system. As illustrated in Figure 3, an output of the synchronizing pulse generator is coupled through potentiometer 346 to the plate 2 of oscillator 1 to provide the test pulses, *tp*, required therefor. For this purpose, the periodic pulses should occur during the interval between the transmitted radar pulses. The time relationship between transmitted radar pulses *rp* and test pulses *tp* is represented approximately in Figure 4. For example, in an actual embodiment of the invention a pretrigger pulse output of the synchronizing pulse generator having a duration of six microseconds and, occurring twelve microseconds before the magnetron trigger pulse was found to produce satisfactory results. The potentiometer 346 makes it possible to set the amplitude of the test pulses for the optimum control-system sensitivity. In the aforesaid actual embodiment of the invention it was found that a test pulse amplitude of five volts applied to the reflector plate 2 of the klystron produced good results. It should be noticed that if the test pulses and the radar transmitter pulses should occur concurrently the portion of the output of klystron oscillator 1 used for heterodyning with the transmitter pulses in AFC mixer 322 would be momentarily deranged thereby producing unsatisfactory operation of the radar system.

As is well known, electrical AFC systems are effective only when the controlled frequency is within a predetermined band of frequencies usually established by the frequency band-pass characteristic of a tuned circuit. Accordingly, when apparatus containing such systems is first energized, and sometimes afterward during operation, the controlled frequency may not be within the effective frequency band of the AFC system. When such is the case, the controlled frequency must be changed manually or automatically to bring it within the range of effectiveness. In the conventional reflector plate AFC system used in the preferred embodiment of the invention, this adjustment of the controlled frequency occurs automatically.

For example, if the controlled frequency should be outside the effective frequency range, the system automatically begins "searching" by sweeping the reflector plate potential, $-E_r$, over a considerable voltage range and thereby producing changes in the frequency of the klystron local oscillator 1. During search, the sweep of the reflector plate voltage, $-E_r$, is produced by applying a sawtooth voltage 355 developed in the AFC voltage generator 325 to the plate 2 of the klystron local oscillator 1. When the frequency of the klystron is swept through the effective frequency band, the AFC control circuit automatically "locks in" and the search sweep ceases. For a thorough explanation of the operation of such a reflector plate AFC system refer to chapter 3, section 12, Microwave Receivers, volume 23 of the Radiation Laboratory Series.

In the preferred embodiment of the subject invention, it is necessary to render the servo follow-up control channel, represented within the dotted lines 301, inoperative during the time that "searching" operation of the reflector plate AFC system is occurring. This is necessary because the servo follow-up channel otherwise will respond spuriously to the sawtooth search pulses. Accordingly, the protective relay circuit 349 is provided to interrupt the 300-volt D.-C. plate supply potential in the pulse amplifier 9 during the occurrence of the sawtooth sweep pulses 355, thereby effectively disconnecting the servo follow-up channel 301.

As represented in Figure 3, the relay circuit 349 is comprised of triode switch 358 and triode rectifier 359. The triode rectifier 359 is connected in series between the AFC voltage generator 325 and the grid circuit of triode 358 such that it will pass only the positive peaks of the sawtooth sweep-search wave 355. The coupling capacity 367 prevents direct current flow between the AFC voltage generator 325 and the relay circuit 349. The resistor 370 provides positive potential for the plate 373 of the triode rectifier 359.

The triode switch 358, normally biased to plate current cut off, has a magnetic relay 361 connected between the plate 364 and the +300-volt plate source. The relay 361 is linked mechanically to the switch 391 in the plate circuit of the pulse amplifier 9. The D.-C. bias potential for the grid 376 of triode switch 358 is produced across resistor 379. The capacitor 382 integrates the positive sawtooth peaks passed by the triode rectifier 359 to provide a comparatively smooth unidirectional potential on the grid 376. The D.-C. bias voltage for the cathode of triode switch 358 is produced across the voltage divider comprised of resistors 385 and 388 connected in series between the +300-volt source of plate potential and the ground source of constant potential.

Although the switch 391 is represented in Figure 3 as adapted to disconnect the 300-volt plate supply potential from the entire pulse amplifier 9, it should be realized that it may be located anywhere in the AFC system provided that it will be effective to render only the servo follow-up control channel 301 inoperative during the sweep-search intervals in the operation of the reflector plate AFC system. For example, the switch 391 may be located to disconnect the plate voltage supply from any one of the stages of the pulse amplifier 9 or, alternatively, the switch 391 may be placed in the lead coupling the AFC mixer 322 to the pulse amplifier 9, or between the pulse amplifier 9 and the polarity discriminator 10. Other suitable locations may become apparent to persons skilled in the art.

*Operation of the Figure 3 embodiment*

A typical cycle of operation of the preferred embodiment of the invention will be described with reference to Figure 3.

Assume that the radar system has been energized. The output pulses from the magnetron 334 of the radar transmitter 304 and the continuous output signal from the klystron local oscillator 1 are conducted through independent paths to the attenuators 328 and 331 respectively, and thence to the AFC mixer 322. Here, the frequencies of the two outputs are heterodyned to produce a resultant difference-frequency output. This output passes through line 352 into the AFC voltage generator 325 where variations in the value of the difference-frequency from the radar-receiver intermediate frequency are detected and utilized to generate an AFC control voltage which is applied through line 353 to the plate 2 of oscillator 1 to change its frequency in the direction required to restore the difference frequency to that of the required intermediate frequency.

As previously explained, it is improbable that the output frequency of the local oscillator 1 will be within the narrow band of frequencies, extending above and below the intermediate frequency, to which the AFC voltage generator 325 will respond during the time immediately following activation of the system. Furthermore, for reasons well-known to those skilled in the art, frequency variations of large magnitude sometimes will cause the difference frequency received by the AFC voltage generator 325 to exceed the limits of its band of effective control frequencies and, as a result, the radar system will be operating without automatic frequency control unless provision is made to restore the difference frequency to some value within the band of frequencies to which the reflector plate AFC system will respond. The operation of the AFC voltage generator is such that the aforesaid restoration of the difference frequency occurs automatically. Thus, when the difference frequency exceeds the band limits, the generator automatically will begin to produce a sweep-search voltage wave 355 which is applied to the plate 2 of the reflex klystron local oscillator 1 to vary its unidirectional negative potential, —E*r*, through a comparatively large range which, for example, may be large enough to fluctuate the output frequency through a multiplicity of operating modes.

When the sweep-search wave 355 sweeps the frequency output of the local oscillator 1 through the effective frequency band within which the reflector plate AFC system is constructed to be responsive, the system automatically "locks in" and the sweep-search wave 355 ceases. A thorough description of the "search" and "lock in" operation of such conventional AFC systems is set forth in the last-cited reference.

The search-sweep wave 355 also is applied to the protective relay circuitry 349 which is actuated, as explained above, to open switch 391 and thereby prevent spurious responses in and overloading of the servo follow-up channel 301 which otherwise will be produced by the large fluctuations in the power output of local oscillator 1 caused in turn by the large amplitude sweep-search waves 355 applied to its plate 2.

After the "search phase in the operation of the reflector plate AFC system has been completed, the AFC voltage generator 325 produces a control voltage which regulates the magnitude of the negative unidirectional potential, —E*r*, applied to the reflector plate 2 of the local oscillator 1 such that its output frequency is made to follow or "track" almost instantaneously the usual rapid, small-amplitude fluctuations in the pulse output frequency of the magnetron 334. As explained above in conjunction with Figure 1, changes in the reflector plate potential, —E*r*, produce corresponding changes in the locus of the oscillator operating point, P, on the mode curve. A change in the operating point also produces corresponding changes in the frequency, F, and the power output, W, of the oscillator 1.

Now, assume that it is desired to change the transmitter magnetron 334 to a new operating frequency. This is accomplished from the remote frequency control unit 307 located at a distance from the radar transmitter 304 by energizing and controlling the tuning drive motor 337 to position the spline 343 of the magnetron 334 through the mechanical coupling 340. The dimensions of the resonant cavity of the magnetron and, hence, the transmitter output frequency are determined by the position of the spline 343.

When the frequency of the magnetron begins to change, the difference frequency output of the AFC mixer 322 also changes. The AFC voltage generator 325 then operates in response to this changing output to produce a control voltage which will change the reflector-plate potential, —E*r*, of oscillator 1 such that its output frequency will follow the changing magnetron frequency and thereby maintain the difference frequency output of the AFC mixer 322 at a comparatively constant value.

However, the reflector plate AFC system cannot compensate in this manner for any except small changes in the output of magnetron 334 because such systems lose their effectiveness when the amount of local oscillator frequency change required for "tracking" exceeds that which can be produced by changing the reflector plate potential, —E*r*, through the portion of the mode within which effective output frequency variations at a usable amplitude occur.

As explained above, it is a principal objective of the subject invention to overcome this inherent limitation in the reflector-plate AFC system. In the preferred embodiment, this objective is accomplished by utilizing the apparatus, described in conjunction with the basic embodiment, Figure 2, as a mode-shifting circuit to cause the mode of operation of the reflex klystron oscillator 1 to "track" or follow the changing frequency of the pulses from magnetron 334. Thus, when the reflector plate AFC system approaches its limit of effective frequency compensation within the mode of oscillation, the mode-shifting apparatus becomes operative to shift the mode of oscillation itself in the direction required to prevent the limit from being exceeded. As a result, the reflector plate AFC system will remain operative throughout the time that the transmitter magnetron frequency is undergoing change.

In Figure 3, the mode-shifting apparatus is comprised of the servo follow-up channel 301, which contains apparatus identical to that described in conjunction with Figure 2; the usual conventional synchronizing pulse generator 319 of the radar system, the counterpart of the test pulse source 4 of Figure 1, which produces a series of pulses, *tp*, occurring during the intervals between radar pulses; and the crystal current filter circuit of the AFC mixer 322 which is the counterpart of the detector-integrator 8 of Figure 2.

If it is assumed that the frequency of the magnetron 334 is increased, the output frequency of the local oscillator 1 also must be increased to maintain a constant difference frequency output from the AFC mixer 322. A reference to curve F of Figure 1 discloses that the requisite increase in the output frequency of the local oscillator 1 occurs when the unidirectional potential, —E*r*, on the reflector plate 2 is made increasingly negative. It should be apparent, therefore, that the output polarity of the AFC voltage generator 325 is such that the reflector plate 2 is made more negative in order to cause the output frequency of the local oscillator 1 to increase along with and in proportion to that of the magnetron 334.

A further reference to Figure 1 reveals that the operating point, P, for increasingly negative values of reflector plate potential, $-Er$, is to the right of the point of maximum power output, P*m*, on the portion of the mode curve having negative slope. As explained above, when the operating point is on this portion of the curve, a voltage pulse of sufficient amplitude and duration applied to the reflector plate 2 produces a corresponding transient increase in the power output of the reflex klystron oscillator 1. Accordingly, when the positive test pulses, *tp*, from the synchronizing pulse generator 319 are applied to the reflector plate 2 of local oscillator 1 during the interval between radar pulses, pulsations in its output power are produced. These pulsations are detected and integrated by the crystal current filter circuit of the AFC mixer 322 to form positive error pulses, *ep*1, which are passed into the servo follow-up channel 301 through lead 389. The operation of this channel is the same as that previously described for the apparatus of Figure 2 having the same reference numerals. In general, this circuit is responsive to error pulses, *ep*1 or *ep*2, to tune the resonant cavity of the reflex klystron local oscillator 1. As explained above, retuning the resonant cavity effectively shifts the mode of oscillation through the frequency spectrum.

The error pulses, *ep*1, received by the servo follow-up channel 301 are amplified in pulse amplifier 9, detected as to polarity and integrated in polarity discriminator 10 to form a unidirectional control potential. This control potential is then applied to the differential relay 11 which, in turn, positions the reversing switch 12 to cause the reversible motor 13 to rotate in such a direction that the tuning spline 15 of oscillator 1 is adjusted to shift the mode of oscillation through the spectrum in the direction of higher frequency. The operation of the servo follow-up channel 301 ceases when the point of maximum power output, P*m* of Figure 1, approaches coincidence with the operating point, P.

To summarize: As the output frequency of transmitter magnetron 343 is increased or decreased the conventional reflector plate AFC system comprised of AFC mixer 322 and AFC generator 325 operates to change the reflector plate potential, $-Er$, of reflector plate 2 in such a direction that the operating point, P, of the reflex klystron local oscillator 1 is moved to the right or left respectively of the point of maximum power output, P*m*, on the mode curve, Figure 1. The test pulses, *tp*, originating in the synchronizing pulse generator 319 during the intervals between transmitted radar pulses, *rp*, are applied to the reflector plate 2 to produce positive or negative error pulses, *ep*1 or *ep*2. These pulses are utilized in the servo follow-up channel 301 to control the reversible motor 13 and thereby tune the resonant cavity of the reflex klystron local oscillator 1 to shift its mode of oscillation in the direction required to maintain the point of maximum power output, P*m*, and the operating point, P, in close proximity to each other. As a result, the reflector plate AFC system remains operative during comparatively slow, large magnitude changes in the output frequency of magnetron 334, such as those changes which occur, for example, when the transmitter is tuned to a new operating frequency.

The details illustrated in the accompanying drawings and set forth in the foregoing description are intended merely to facilitate the practice of the invention by persons skilled in the art. The scope of the invention is represented in the following claims.

I claim:

1. A generator for producing an electric-wave output of microwave frequency characterized by fluctuations in output power and including means for maintaining the said output power at maximum comprising: a reflex-klystron oscillator having a reflector plate and a tunable resonant cavity; means for tuning the said resonant cavity; a source of unidirectional negative potential coupled to the said reflector plate; a source of voltage pulses coupled to the said reflector plate for producing periodic fluctuations in the said reflector plate potential such that corresponding transient changes of significant polarity occur in the output power from the said oscillator when less than maximum output power is being generated; a load output channel coupled to the resonant cavity of the said oscillator; means diverting a portion of the microwave output power from the said output channel; means coupled to the said diverting means detecting the said transient changes occurring in the output power; means coupled to the said detecting means integrating the said detected transient changes of output power to form unidirectional pulses of significant polarity; and a closed servo control loop operative in response to the said unidirectional pulses and adjusting the said cavity-tuning means to maintain the output power of the system at maximum.

2. The generator represented in claim 1 wherein the said closed servo control loop comprises: means amplifying the said integrated pulses coupled to the said integrating means; means coupled to the said amplifier means discriminating the polarity of the said amplified pulses and including means generating a unidirectional voltage representative of the said pulse polarity; and means responsive to the said unidirectional voltage adjusting the said cavity tuning means such that the output power of the said oscillator is maintained at maximum.

3. The generator represented in claim 2 wherein the said unidirectional-voltage responsive means comprises: means including a differential relay responsive to the said unidirectional voltage; means including a reversing switch coupled mechanically to the said differential relay; means energized through the said reversing switch actuating the said resonant cavity tuning means; and means mechanically coupling the said actuating means to the said resonant cavity tuning means.

4. A generator as represented in claim 3 wherein the said actuating means includes a reversible motor.

5. A generator as represented in claim 3 wherein the last-mentioned mechanical coupling means includes a reducing gear train.

6. A generator as represented in claim 3 wherein the said diverting means includes an attenuator.

7. An automatic frequency control system for effecting changes in the frequency of a first continuously-operating, reflex-type, velocity-modulated, cavity-tuned oscillator in response to rapid and slow small-magnitude and comparatively slow large-magnitude changes in the frequency of a second periodically operating oscillator such that a substantially fixed range of difference frequencies may be maintained comprising: a continuously-operating, reflex-type, velocity-modulated, cavity-tuned oscillator wherein the output power and frequency are functions of a unidirectional negative potential, said oscillator having a reflector plate, tunable resonant cavity, an output channel, and producing a controlled frequency wave; a source of unidirectional negative potential coupled to the said reflector plate; means for tuning the said resonant cavity; a periodically operating oscillator having an output channel and producing a reference frequency wave; means for tuning the said periodically operating oscillator; means responsive to the aforesaid controlled and reference frequency waves producing a difference frequency wave; means responsive to the said difference frequency wave generating a first control signal; means coupling the said first control signal to the said reflector plate of the continuously operating oscillator such that the said unidirectional potential is varied in a direction and by an amount which will tend to cause the output frequency to follow the frequency variations of the said periodically operating oscillator thereby maintaining the said difference frequency at a predetermined value; a source of voltage pulses time spaced to occur between operating periods of the aforesaid periodically operating oscillator; means applying the said voltage pulses to the said reflector plate producing corresponding fluctuations in the output power of the aforesaid continuously operating oscillator; means responsive to the aforesaid power fluctuations to produce a second control signal; and means responsive to the said second control signal maintaining the output power of the said continuously operating oscillator at maximum notwithstanding slow large-magnitude changes in the said reference frequency.

8. Apparatus automatically maintaining a fixed range of difference frequencies between the outputs of two electric wave generators comprising: a controlled-frequency wave generator having first and second means for tuning, said first tuning means operative to produce concurrently diminutions of output power and deviations of controlled frequency output as a result of variations in the tuning of the said first tuning means from a tuned state yielding maximum power output, said state being established by the said second tuning means; a reference-frequency wave generator characterized both by rapid and slow small-magnitude, and by comparatively slow large-magnitude fluctuations of reference frequency output signal; means responsive to the respective output signal frequencies of the said controlled and reference frequency generators producing a difference frequency output signal; means responsive to the said difference frequency output signal retuning the said first tuning means to maintain the said difference frequency output signal fixed within a predetermined range of frequency, the range of frequencies to which the said last-mentioned means will respond being limited by zero-going diminutions in the output power of the said controlled-frequency generator as the amount of retuning of the said first tuning means required to maintain the said difference frequency output fixed within the said predetermined range of frequencies becomes greater; means coupled to said first tuning means producing time-spaced fluctuations in the output power of the said controlled-frequency generator whenever less than maximum output power is being generated, said fluctuations being of positive-going voltage pulses indicative of the retuning of the said second tuning means required to maintain the output power of the said controlled frequency generator at maximum; and means responsive to the said output power fluctuations retuning the said second tuning means such that maximum output power of the controlled frequency oscillator is maintained notwithstanding the large magnitude of slow variations in the said reference frequency.

9. Apparatus automatically maintaining a fixed range of difference frequencies between the outputs of two electric wave generators comprising: a controlled-frequency wave generator having first and second means for tuning, said first tuning means operative to produce concurrently diminutions of output power and deviations of controlled frequency output as a result of variations in the tuning of said first tuning means from a tuned state yielding maximum power output, said state being established by said second tuning means; a reference-frequency wave generator characterized both by rapid and slow, small-magnitude and by comparatively slow, large-magnitude fluctuations of reference-frequency output signal, said reference-frequency wave generator means including means for adjustably producing slow, large-magnitude changes in said output frequency; means responsive to the respective output signal frequencies of said controlled and reference-frequency generators producing a difference frequency output signal; means responsive to said difference frequency output signal retuning said first tuning means to maintain the said difference frequency output signal fixed within a predetermined range of frequency, the range of frequencies to which said last-mentioned means will respond being limited by zero-going diminutions in the output power of said controlled frequency generator as the amount of retuning of said first tuning means required to maintain said difference-frequency output fixed within said predetermined range of frequencies becomes greater; means coupled to said first tuning means producing time-spaced fluctuations in the output power of said controlled frequency generator whenever less than maximum output power is being generated, said fluctuations having a polarity indicative of the retuning of said second tuning means required to maintain the output power of said controlled frequency generator maximum; means detecting said fluctuations of output power; means coupled to said detecting means integrating said detected fluctuations of output power to form unidirectional pulses of significant polarity; and a closed servo control loop operative in response to said unidirectional pulses adjusting said second tuning means to maintain the output power of said controlled frequency generator at maximum notwithstanding the large magnitude of slow variations in said reference frequency.

10. In a radar pulse transmitting and receiving system, apparatus automatically maintaining a fixed range of difference frequencies between the respective output frequencies of the magnetron oscillator of the transmitter and the klystron local oscillator of the receiver notwithstanding slow and rapid small-magnitude and slow large-magnitude variations in the output frequency of the said magnetron oscillator comprising: a continuously-operating reflex-type klystron local oscillator having resonant-cavity tuning means and further characterized by variations in output frequency and zero-going diminutions in output power whenever the unidirectional negative potential applied to its reflector plate is changed from a value predetermined by the tuning of the said resonant cavity; a source of unidirectional negative potential connected to the reflector plate of the said klystron; a magnetron transmitter oscillator subject to slow and rapid small-magnitude and slow large-magnitude variations in its output frequency; a synchronizing pulse generator producing magnetron trigger pulses and pretrigger pulses, said latter pulses occurring between the said trigger pulses; means causing the said magnetron trigger pulses to excite the said magnetron periodically to produce radar pulse energy; an automatic frequency control mixer for producing a difference frequency continuously equal to the instantaneous difference between the respective output frequencies of the said transmitter magnetron oscillator and the said receiver klystron oscillator, a portion of the said mixer also producing error pulses corresponding in duration and polarity to any output power fluctuations of the said klystron local oscillator which may occur in the intervals between the said radar trigger pulses; means supplying a portion of the said radar pulse energy to the said automatic frequency control mixer; means supplying a portion of the klystron local oscillator output energy to the said automatic frequency control mixer; an automatic frequency control voltage generator responsive to the difference frequency from the said automatic frequency control mixer to generate first and second unidirectional signal output coupled, in turn, in additive relation to the reflector plate of the said klystron local oscillator, said first signal output occurring whenever the said difference frequency has a value outside the narrow band of frequencies to which the control voltage generator will respond to generate the said second control signal and having a waveform effective to cause the output frequency of the said klystron to sweep periodically and repetitively through a wide range of frequencies within which the said narrow band may be included, said second signal output occurring whenever the said difference frequency occurs within the said narrow band of frequencies and having the effect of causing the output frequency of the said klystron local oscillator to follow small-magnitude slow and rapid fluctuations in the output frequency of the said transmitter magnetron; means applying the said pretrigger pulses to the reflector plate of the said klystron local oscillator to produce corresponding output power fluctuations whenever less than maximum output power is being generated, the said output power fluctuations having a magnitude and polarity indicative of the amount and direction of retuning of the said resonant-cavity tuning means required to restore the output power to maximum; a servo follow-up control channel; means conducting error pulses corresponding in duration and polarity to the said output power fluctuations from the said automatic frequency control mixer to the said servo follow-up channel, said servo follow-up channel including a pulse amplifier, a polarity discriminator coupled to the said pulse amplifier for producing a unidirectional voltage having a magnitude dependent upon the polarity and magnitude of the said error pulses, a reversing switch, a differential relay responsive to the said unidirectional voltage and coupled to the said reversing switch, a reversible motor controlled in operation and direction of rotation through the said reversing switch, and means coupling the said reversible motor to the said resonant-cavity tuning means of the klystron local oscillator whereby the said resonant cavity will be retuned to maintain the output power of the said local oscillator at maximum notwithstanding the slow large-magnitude changes in output frequency of the said receiver local oscillator required to follow the concurrent slow large-magnitude changes in the output frequency of the said transmitter magnetron.

11. Apparatus as represented in claim 10 including means for adjusting the amplitude of the said pretrigger pulses.

12. Apparatus as represented in claim 11 including means responsive to and rendering the said servo follow-up channel inoperative during intervals when the said first unidirectional control signal is being generated by the said automatic frequency control voltage generator.

13. Apparatus as represented in claim 10 including adjustable means for tuning the said transmitter magnetron to new operating frequencies, said adjustable means further including means for effecting changes in output frequency of the said transmitter magnetron from a location remote from the said transmitter.

References Cited in the file of this patent

UNITED STATES PATENTS

| | | |
|---|---|---|
| 2,523,537 | Mayer | Sept. 26, 1950 |
| 2,562,304 | Durand | July 31, 1951 |
| 2,583,023 | Spangenburg | Jan. 22, 1952 |
| 2,722,607 | Rubin | Nov. 1, 1955 |
| 2,748,384 | Crane | May 29, 1956 |
| 2,754,420 | Ratcliffe | July 10, 1956 |
| 2,789,226 | Nibbe | Apr. 16, 1957 |
| 2,797,325 | Cox et al. | June 25, 1957 |